United States Patent [19]

Kemp et al.

[11] 3,760,833
[45] Sept. 25, 1973

[54] SEALING MEANS FOR VALVE STRUCTURE
[75] Inventors: Willard E. Kemp; Jerry B. Tomlin, both of Houston, Tex.
[73] Assignee: ACF Industries, Incorporated, New York, N.Y.
[22] Filed: Mar. 14, 1972
[21] Appl. No.: 234,557

[52] U.S. Cl............. 137/246.22, 251/174, 251/315
[51] Int. Cl.............................................. F16k 5/20
[58] Field of Search.................... 251/170–175, 315; 137/246.22

[56] References Cited
UNITED STATES PATENTS

| | | | |
|---|---|---|---|
| 2,945,668 | 7/1960 | Staller et al. | 251/175 |
| 2,988,320 | 6/1961 | Kent | 251/174 |
| 3,078,865 | 2/1963 | Estes et al. | 137/246.22 |
| 3,160,387 | 12/1964 | Windsor | 251/172 |
| 3,416,558 | 12/1968 | Works | 251/174 X |
| 3,667,727 | 6/1972 | Bowden | 251/174 X |

Primary Examiner—Martin P. Schwadron
Assistant Examiner—Richard Gerard
Attorney—Eugene N. Riddle

[57] ABSTRACT

A spherical plug valve structure having a seat assembly on opposed sides of a ball valve member. Each seat assembly is mounted for limited longitudinal movement toward and away from the adjacent ball valve member and an annular recess in the seat assembly receives a sealing element having a free lip portion in sealing contact with the valve member. An annular groove contiguous with the recess and facing in a direction generally perpendicular to the recess receives a resilient O-ring which is in contact with and provides a resilient support for the lip portion of the sealing element. The sealing element has its free end terminating generally adjacent the groove and may be partially received within the groove upon contact with the ball valve member particularly under high pressure conditions.

7 Claims, 4 Drawing Figures

PATENTED SEP 25 1973 3,760,833

SEALING MEANS FOR VALVE STRUCTURE

BACKGROUND OF THE INVENTION

In the manufacture of spherical plug valves the spherical ball member normally has relatively small surface imperfections, undulations, or indentations. Further, the ball member is usually not a perfect sphere. Thus, it is desirable for the sealing element which is in contact with the ball to have a resilience in order to shape itself to the surface of the spherical ball member even though the ball member may have surface imperfections or not be perfectly round. Additionally, it is desirable for the sealing element to have a relatively sharp corner or edge in contact with the ball surface for fitting within any grooves or indentations on the ball surface thereby to provide an effective seal. If a seal or sealing element does not give or have a substantial resilience, the seal may be crushed by the valve member particularly under high pressure conditions.

DESCRIPTION OF THE PRESENT INVENTION

The present invention is directed to a seat assembly for a spherical plug valve with a seat assembly mounted adjacent a ball valve member and having a sealing element secured within a recess in the seat assembly. The sealing element has a free lip portion extending from the recess adapted to engage in sealing engagement the adjacent working surface of the ball valve member. An annular groove in the seat assembly adjacent and radially outwardly of the recess receives a resilient O-ring in contact with the lip portion of the sealing element to urge the sealing element into contact with the ball valve member. The lip portion of the sealing element has an outer surface terminating adjacent the O-ring or groove receiving the O-ring and may be urged outwardly by the ball valve member against the O-ring within the confines of the annular groove upon a close spacing of the ball valve member from the seat assembly as would occur under a relatively high pressure condition. Such contact with the O-ring deforms the O-ring and minimizes wear on the sealing element. It is desirable for the sealing element to have a relatively sharp edge in contact with the surface of the ball valve member in order to shape itself to the surface of the ball member even though the ball member may have surface imperfections or not be perfectly round. The sealing element is permitted to give by the resilient O-ring behind the sealing element thereby minimizing crushing or blunting of the edge of the sealing element in contact with the working surface of the ball valve member.

The sealing element may be formed of a suitable resilient material, such as nylon or Teflon and will shape itself to any imperfections on the working surface of the adjacent ball valve member.

The invention accordingly comprises the constructions hereinafter described, the scope of the invention being indicated in the following claims.

In the accompanying drawings, in which one of various possible embodiments of the invention is illustrated, FIG. 1 is a sectional view illustrating a spherical ball valve embodying the sealing assembly comprising the present invention;

Figure 1:
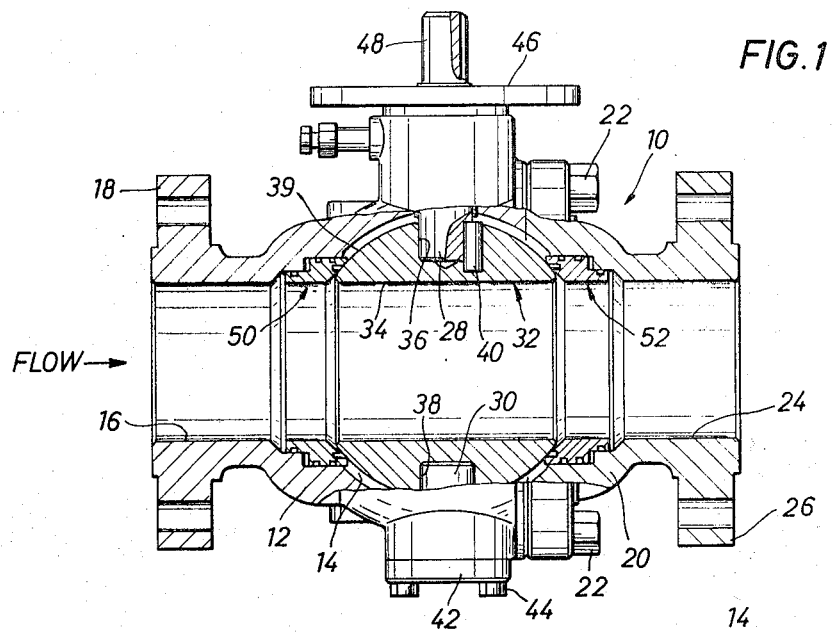

Referring now to drawings for a more complete understanding of the invention, a spherical plug valve is illustrated at 10 in FIG. 1 and has a valve body portion 12 thereon defining a valve chamber 14. Valve body portion 12 has an inlet flow passage 16 in fluid communication with valve chamber 14 and a flange 18 which may be bolted to a pipeline or other conduit, for example. An end closure portion 20 of valve 10 is secured to valve body portion 12 by a series of threaded studs 22. End closure member 20 has an outlet flow passage 24 and a flange 26 which may be bolted to a pipeline or other suitable conduit.

Valve body 12 has an upper trunnion 28 and a lower trunnion 30. A ball valve member generally indicated 32 has a central bore 34 adapted to align with flow passages 16 and 24 in an open position of valve member 32. An upper bore 36 receives upper trunnion 28 and a lower bore 38 receives lower trunnion 30 to mount valve ball member 32 for rotation. A key 40 is provided between upper trunnion 28 and valve member 32 to provide a non-rotatable connection therebetween.

A lower cover plate 42 is fixed to valve body 12 by suitable bolts 44 and permits an access to lower trunnion 30. An operator adapter plate 46 is fixed to valve body 12 and receives the upper end portion 48 from trunnion 28 which extends through a suitable aperture in adapter plate 46. Any of a number of commercially available power or manually actuated valve operated devices may be fixed to adapter plate 46 in a desirable manner to provide mechanical means to impart rotation to upper stem portion 48 and thereby the spherical ball valve member 32 for moving ball valve member 32 between open and closed positions thereof.

Figure 2:
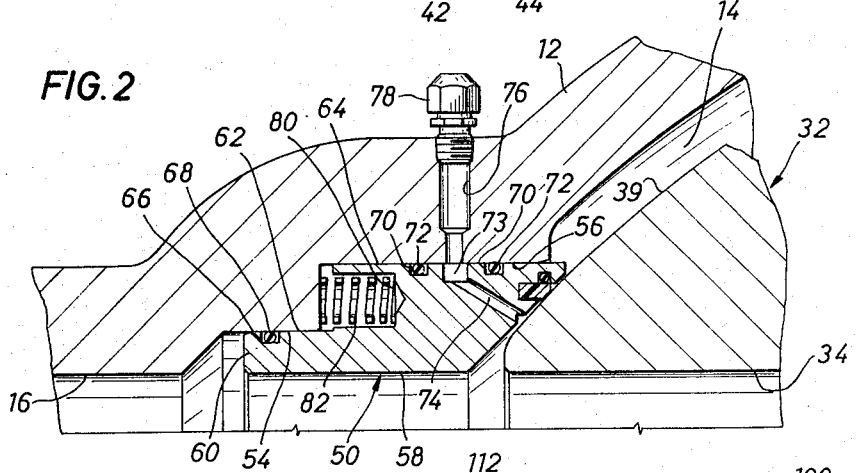
FIG. 2 is an enlarged fragment of FIG. 1 indicating a lubricant bore and lubricant fitting for lubricating the working surface of the ball valve member.

To establish a seal between the rotatable ball valve member 32 and valve body 12 including body closure member 20, a pair of identical annular seat assemblies 50 and 52 are provided. Seat assembly 50 is an upstream seat assembly and seat assembly 52 is a downstream seat assembly. To receive seat assembly 50, valve body 12 has a stepped recess forming an intermediate radial surface 54 and an outer radial surface 56. Seat assembly 50 has an inner circumferential surface 58 in axial alignment with adjacent flow passage 16 and central bore 34 of ball valve member 32 in the open position thereof as shown in FIG. 2. Extension 60 between inner circumferential surface 58 and intermediate circumferential surface 62 is in facing contact with intermediate radial surface 54 of valve body 12. An outer circumferential surface 64 is in facing contact with outer radial surface 56 on valve body 12. An annular groove 66 in circumferential surface 32 receives an O-ring 68 to provide a seal between adjacent surfaces 54 and 62. A pair of spaced annular grooves 70 in annular surface 64 receive O-rings 72 to provide a seal between adjacent surfaces 56 and 64. An annular lubricant groove 73 extends about the outer circumference of seat assembly 50. A plurality of lubricant ports 74 in seat assembly 50 communicate with lubricant groove 73. A body opening 76 in valve body 12 is in fluid communication with annular groove 73. A suitable fitting 78 communicates with opening 76 and a suitable supply of lubricant may be injected through fitting 78 to lubricate working face 39 of ball valve member 32.

A plurality of spring chambers 80 are radially spaced about seat assembly 50. A coil spring 82 is positioned within each of the spring chambers 80 and urges seat assembly 50 into sealing engagement with ball valve member 32.

Figure 3:
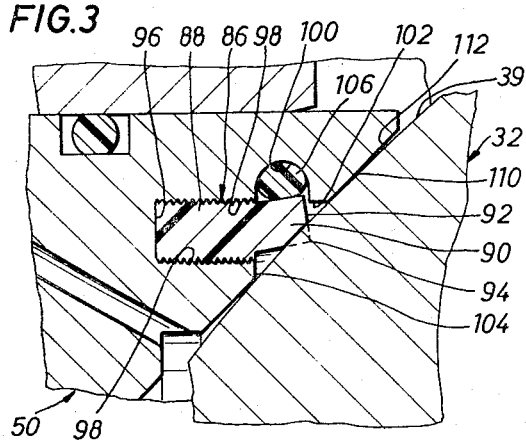
FIG. 3 is an enlarged section of the seat assembly of the present invention illustrating the sealing element in sealing contact with the spherical ball member under relatively high pressure conditions.
Figure 4:
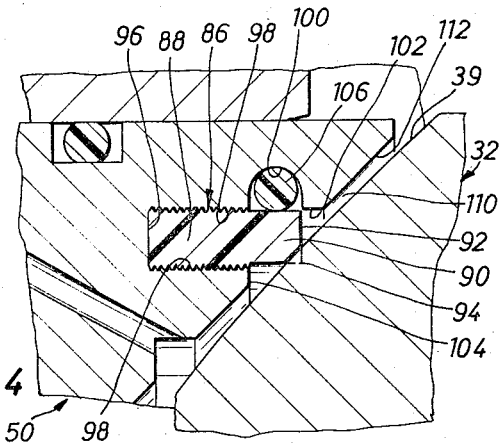
FIG. 4 is a sectional view similar to FIG. 3 but showing the seating assembly and sealing element in sealing contact with the spherical ball member under relatively low pressure conditions.

Referring particularly now to FIGS. 3 and 4 in which the present invention is particularly shown, a sealing element is generally indicated at 86. Sealing element 86 includes a base portion 88 and an extending free lip portion 90 having an outer relatively flat end surface 92 and a relatively sharp edge 94 which is adapted to engage working surface 39 of ball valve member 32. An annular recess 96 in seat assembly 50 opens in a direction generally parallel to flow passage 16. Wall surfaces 98 of recess 96 are serrated and base portion 88 of sealing element 86 upon being pressed within recess 96 is anchored by serrated surfaces 98. Sealing element 86 may be formed of a suitable resilient material, such as nylon or tetrafluoroethylene sold under the trademark "Teflon." Sealing element 86 has a generally rectangular cross section but could be of a different cross section, if desired. An annular groove 100 adjacent recess 96 faces in a direction generally perpendicular to annular recess 96. A flat surface 102 adjacent groove 100 is a continuation of the outer wall surface defining recess 96, and flat portion 104 is a continuation of the inner surface defining annular groove 100. Surfaces 102 and 104 may be beveled, if desired, and thereby do not present a sharp edge adjacent sealing element 86.

An O-ring 106 is positioned within annular groove 100 and is of a diameter to extend slightly beyond the opening of annular groove 100 to contact lip portion 90 of sealing element 86 and urge nose or edge 94 of sealing element 86 into engagement with working surface 39 of ball valve member 32. While a resilient O-ring 106 has been illustrated as positioned within groove 100, it is apparent that other types of resilient spring arrangements could be positioned within groove 100 to urge lip portion 90 outwardly and to permit lip portion 90 to be pressed inwardly to deform such a spring element.

FIG. 3 illustrates the spacing or extrusion gap 110 between working surface 39 of ball valve member 32 and adjacent facing surface 112 for a relatively low pressure condition within flow passage 16 when ball valve member 32 is in a closed position. FIG. 4 illustrates spacing 110 between surfaces 39 and 112 under a relatively low pressure condition. For example, a ball valve structure with a flow passage of a diameter of around 30 inches and a low pressure of around 10 psi would have a spacing 110 between surfaces 39 and 112 between around 0.030 inch and 0.043 inch. For a relatively high working pressure of around 1,600 psi such as shown in FIG. 4, spacing 100 might be between around 0.003 inch and 0.005 inch. Thus, sealing element 86 must have a resilience in order to maintain a tight sealing contact with working surface 39 of ball valve member 32. It is desirable that sealing element 86 have a relatively sharp edge or nose in contact with working surface 39 of valve member 32 in order to provide the most effective sealing contact. If a sealing element is not allowed to give, the relatively sharp edge in contact with the ball member will be crushed or blunted by wear in a relatively short period of time which will effectively reduce its sealing capacity. As shown in FIG. 3, surface 92 of lip portion 90 terminates adjacent groove 100 and lip portion 90 will be urged by ball valve member 32 into the void area provided by groove 100 upon the deforming of O-ring 106 by lip portion 90.

While flow passage 16 has been indicated as an inner flow passage, it is to be understood that, if desired, the direction of flow could be reversed and seating assembly 52 could be the upstream seating assembly and seating assembly 50 could be the downstream seating assembly. As seating assemblies 50 and 52 are identical, only one seating assembly has been described in detail.

What is claimed is:

1. A spherical plug valve structure comprising a valve body having a valve chamber, upstream and downstream flow passages formed in said valve body and being in fluid communication with said valve chamber, a ball valve member disposed within the valve chamber, means to rotate said ball valve member between open and closed positions to control the flow of fluid through the valve structure, seat recesses formed in the valve body on opposite sides of the ball valve member, a seat assembly mounted within each of said seat recesses, each of said seat assemblies having an outer sealing member defining an outer perimeter of sealing contact between the seat assemblies and said valve body, each of said seat assemblies having an inner sealing member defining an inner perimeter of sealing contact between the seat assemblies and said valve body which is disposed radially inwardly of said outer sealing member and said outer perimeter of sealing contact, an annular recess in each seat assembly facing the adjacent valve member and extending in a direction generally longitudinally of said flow passages, a sealing element having a base portion secured within said recess against any substantial sliding movement longitudinally of said flow passages and a free lip portion extending from said recess to provide sealing contact with said ball valve member, an annular groove in said seat assembly radially outward of said recess and facing in a direction generally perpendicular to said recess, said recess having its outer extent contiguous to said annular groove and said free lip portion of said sealing element terminating adjacent said annular groove, and resilient means positioned within said annular groove in contact with the lip portion of said sealing element to urge said sealing element into contact with said valve member, said resilient means permitting said lip portion to be depressed outwardly by the valve member within the confines of said annular groove thereby to minimize wear of said sealing element.

2. A valve structure as set forth in claim 1 wherein at least some of the surfaces defining said annular recess are serrated and the base portion of said sealing element is secured within said recess by said serrated surfaces.

3. A valve structure as set forth in claim 1 wherein said sealing element comprises a Teflon sealing element being generally rectangular in cross section, and said resilient means comprises an O-ring.

4. A spherical plug valve structure comprising a valve body having a valve chamber, upstream and downstream flow passages formed in said valve body and being in fluid communication with said valve chamber, a ball valve member disposed within the valve chamber, means to rotate said ball valve member between open and closed positions to control the flow of fluid through the valve structure, seat recesses formed in the valve body on opposite sides of the ball valve member, a seat assembly mounted within each of said seat recesses, means permitting limited movement of said seat assemblies in a direction longitudinally of said flow passages toward and away from said ball valve member, resilient spring means urging said seat assemblies toward said ball valve member, an annular recess in each seat assembly facing the adjacent valve member and extending in a direction generally longitudinally of said flow passages, a sealing element having a base portion secured within said recess against any substantial sliding movement longitudinally of said flow passages and a free lip portion extending from said recess in sealing contact with said ball valve member, said valve structure defining an annular space adjacent and radially outward of said free lip portion with said free lip portion of said sealing element terminating adjacent said annular space, and resilient means positioned within said annular space in contact with the lip portion of said sealing element to urge said sealing element into contact with said valve member, said last mentioned resilient means permitting said lip portion to be depressed outwardly by the valve member within the confines of said annular space thereby to minimize wear of said sealing element.

5. A spherical plug valve structure as set forth in claim 4 wherein each of said seat assemblies has a plurality of radially spaced chambers facing in a direction opposite said valve member, and said resilient spring means comprise coil spring members positioned within said chambers and biased against the valve body to urge the associated seat assemblies into engagement with the valve member.

6. A spherical plug valve structure as set forth in claim 4 wherein a pair of longitudinally spaced sealing members are disposed radially outwardly of said sealing element between the valve body and each seat assembly to provide sealing contact therebetween, a lubricant bore extends through said seat assembly from a position between the sealing members to a position adjacent the valve member inwardly of the sealing element, and means in fluid communication with said lubricant bore to permit lubricant to be supplied thereto.

7. A valve structure comprising a valve body having a valve chamber, upstream and downstream flow passages formed in said valve body and being in fluid communcation with said valve chamber, a valve member disposed within the valve chamber and being movable between open and closed positions to control the flow of fluid through the valve structure, seat recesses formed in the valve body on opposite sides of the valve member, a seat assembly mounted within each of said seat recesses, an annular recess in each seat assembly facing the adjacent valve member and extending in a direction generally longitudinally of said flow passages, a sealing element having a base portion secured within said recess against any substantial sliding movement longitudinally of said flow passages and a free lip portion extending from said recess in sealing engagment with the adjacent surface of the valve member, an annular groove in said seat assembly adjacent and radially outwardly of said recess, said recess having its outer extent contiguous to said annular groove and said free lip portion of said sealing element terminating generally adjacent said annular groove under all operating conditions, and a resilient O-ring positioned within said annular groove in contact with the lip portion of said sealing element to urge said sealing element into contact with said valve member, said O-ring permitting said lip portion to be urged outwardly by the valve member against said O-ring and received within said annular groove thereby deforming said O-ring to minimize wear of said sealing element.

* * * * *